No. 12,525. REISSUED AUG. 28, 1906.

J. A. HORTON.

WIRE DRAWING DRUM.

APPLICATION FILED APR. 14, 1906.

Inventor

J. A. Horton

Witnesses

L. C. Harrison

Wm. S. Hodges

By Wright, Brown, Quinby & May

Attorneys

UNITED STATES PATENT OFFICE.

JAMES A. HORTON, OF PROVIDENCE, RHODE ISLAND, ASSIGNOR TO IROQUOIS MACHINE COMPANY, OF NEW YORK, N. Y., A CORPORATION OF NEW YORK.

WIRE-DRAWING DRUM.

No. 12,525. Specification of Reissued Letters Patent. Reissued Aug. 28, 1906.

Original No. 784,264, dated March 7, 1905. Application for reissue filed April 14, 1906. Serial No. 311,301.

*To all whom it may concern:*

Be it known that I, JAMES A. HORTON, of Providence, in the county of Providence, and State of Rhode Island, have invented certain new and useful Improvements in Wire-Drawing Drums, of which the following is a specificatio This invention relates to wire-drawing machines, and has particular reference to the construction of a drum whereby breaking of the wire on the machine is prevented, the passage of the wire through the dies is facilitated, and related objects accomplished.

The drum hereinafter described is designed with special reference to its use in a machine having drums arranged in two tiers and driven at successively increasing speeds, the wire being wound around the successive drums in the two tiers and passing back and forth from tier to tier and through dies preceding each drum in the series, whereby the wire is subjected to a series of reductions in a continuous operation. The invention may, however, be found applicable to other types of wire-drawing machines.

The invention is embodied in a positively-driven wire-seat mounted for yielding movement on the drum, whereby sufficient lateral yield or give is provided to compensate for variations in the strains upon the wire.

The invention is further embodied in a wire-seat for the drum composed of suitable material, such as copper and tin alloy, similar to the coating ordinarily given to the wire to lubricate its passage through the die, this material being capable of coating a steel wire or one of similar hardness by the attrition of the wire against its seat when the peripheral speed of said seat is different from that of the wire.

The invention is further embodied in the particular construction hereinafter set forth.

Figure 1:
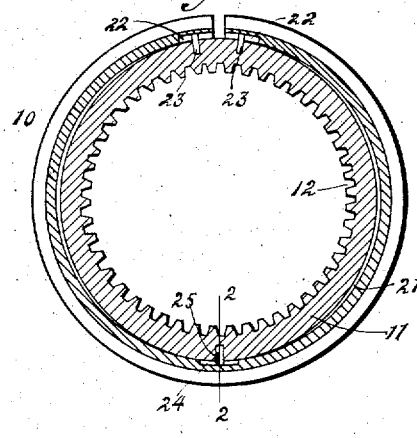
Figure 4:
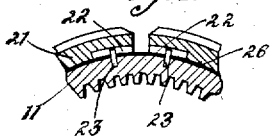
Figure 3:
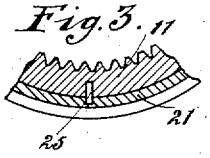
Figure 2:
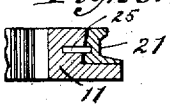
Figure 5:
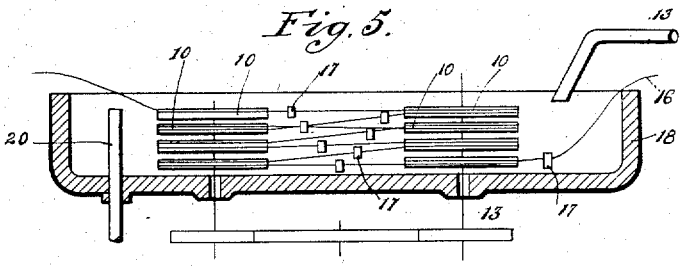
Figure 6:
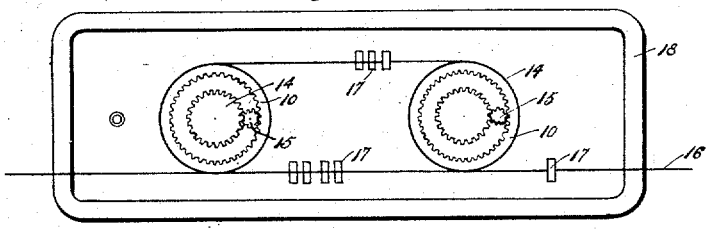

Of the accompanying drawings, Figure 1 represents a horizontal section of a wire-drawing drum constructed according to my invention. Fig. 2 represents a section on the line 2 2 of Fig. 1. Fig. 3 represents a fragmental horizontal section thereof, showing a modification. Fig. 4 represents a similar fragmental view showing another modification. Fig. 5 represents a diagrammatic sectional view showing the principal features of the complete machine. Fig. 6 represents a plan view thereof.

The same reference characters indicate the same parts in all the figures.

In the drawings, 10 is a wire-drawing drum having an annular body 11 provided with internal gear-teeth 12 for driving it. One of the preferred forms of mounting these drums is shown in Figs. 5 and 6, in which it will be seen that the drums are mounted in two tiers on vertical axes and driven from central shafts 13 through gearing 14 15, the wire 16 passing through a reducing-die 17 in advance of each drum and being wrapped one or more turns around each drum to give traction, the wire passing from one drum in one tier to the corresponding drum in the other tier, and then back to the next drum in the first tier, and so on. The drums occupy a trough 18, to which a lubricating liquid is supplied by pipe 19, the overflow being through a pipe 20, whereby the drums, wire, and dies are kept immersed in the liquid.

In the above arrangement and other arrangements of drums for a continuous pass, if employed with plain drums, the wire is subjected to unequal strains from several causes, among which may be a slight eccentricity in some one or more of the drums. A second and probably the most common cause is a tendency of the wire on the winding or storing drum on which the wire is finally wound up to make a few turns on the drum close to the base thereof and then suddenly move upward on its tapered periphery to a point where the diameter is smaller than at the base. This will stop the wire in the several dies until the convolutions on the winding-drum have tightened up, and then when the slack is taken out the wire suddenly starts at the finishing-die and causes a jerk or shock all along the wire and in the several dies. It is desirable to cushion this shock and also to give instant propulsion to the wire at each of the drums in order that the strain may be distributed and not concentrated upon any particular portion or unit of the wire. Another cause of unequal strains is due to what is termed "banking" on the winding or storing drum, whereby the convolutions instead of remaining parallel and slipping up uniformly on the taper of the drum pile one on top of the other. The banked coil will frequently start to rise suddenly on the drum, and thus relieve the strain on the wire, there being then nothing to impel the wire until the convolutions tighten up, the wire starting suddenly when this happens.

Steel wire is commonly coated thinly with a softer lubricating metal such as a copper and tin alloy, to facilitate its passage through the die, and in prior machines working on the continuous-pass system this coating has been worn off, owing to the difference in speed between the wire and the drum, and has collected in the dies, reducing their diameter and causing the wire to break.

My invention is directed to the correction of the above-mentioned evils, and to this end I provide the drums 10 with a yielding wire-seat shown in the form of a split ring 21. As shown in Fig. 1, the ends of said ring are formed on the inside with open-ended grooves 22, occupied by pins 23, fixed in the body of the drum, and the middle of the rings is formed with a groove 24, occupied by a pin 25 on the drum. The ring is therefore positively rotated with the drum, and when not under strain by the tension of the wire it has a slightly oval form, causing it to spring away from the drum, as indicated in Fig. 1. By this construction the ring has a slight lateral yield to compensate for inequalities in the strain on the wire due to slight eccentricity of the drum or other cause, whereby breaking of the wire is prevented. The grooves 22 permit the ends of the ring to approach and recede, and said grooves and the groove 24 allow for a limited peripheral movement of the ring with respect to the body of the drum, as I have found in practice that this gives improved results. The ring 21 may, however, be connected to the body of the drum by the pin 25 without any peripheral play, as indicated in Fig. 3.

The lubricating liquid forms a cushion between the ring 21 and the body of the drum, which is maintained by the immersion of the drum; but the ring may instead be cushioned, as indicated in Fig. 4, by a rubber band or annulus 26, interposed between the ring 21 and drum-body 11, in which case the ring is preferably concentric with the drum.

I am aware that it has been proposed to employ on a wire-drawing drum an expanding traction-ring capable of unlimited peripheral movement on the drum and adapted to be frictionally driven by the drum when closed upon said drum; but such expedient is defective in that it fails to provide for instant propulsion of the wire as soon as the wire coil tightens upon the ring, there being an appreciable interval of time between the starting of the wire around any particular drum and the propulsion of the wire by that drum during which the ring is being closed upon the drum, and the strain on the wire is concentrated in advance of that drum. The tendency to breakage of the wire under such conditions is very great. It will be seen that with the present improvement there is a slight yield at each drum to cushion the shock caused by sudden starting of the wire at the storing-drum, and at the same time each drum by virtue of its positively-driven wire-forwarding means immediately adds its wire-forwarding force when the wire coil tightens around it.

The ring 21 is composed of a lubricating material, such as copper and tin alloy, similar in character to the coating ordinarily placed upon steel wire to facilitate its passage through the dies. If the peripheral speed of the drum and its wire-seat should be different from the speed of the wire, said wire-seat instead of rubbing off the particles of this coating will add to the coating by the attrition of the wire against the ring 21. The material above specified, of which the ring 21 is is made, is softer than steel wire, so that the ring or wire-seat does not rub off or abrade the coating of the wire.

The ring 21 possessses sufficient resiliency to maintain its normal shape and may be sprung apart sufficiently to enable it to be placed upon and removed from the body of the drum, the ring being thus removable and renewable.

I claim—

1. A wire-drawing drum having a positively-driven circumferential wire-forwarding seat mounted for a limited yielding movement.

2. In a wire-drawing machine, a drum having a radially-yielding positively-driven wire-seat.

3. In a wire-drawing machine, a drum, and a shoe or wire-seat so mounted on the drum as to yield elastically to the varying tension of the wire, and connected for positive rotation thereby.

4. In a wire-drawing machine, a drum, a wire-seat driven by and having a peripheral movement on said drum, and means for positively limiting said movement.

5. In a wire-drawing machine, a drum and a circumferential spring-ring forming a seat for the wire so mounted on the drum as to enable it to contract and expand and having a positive driving connection with said drum.

6. In a wire-drawing machine, a drum and a cushioned wire-seat positively driven thereby.

7. In a wire-drawing machine, a drum, a circumferential positively-driven wire-seat thereon, and a cushion between said seat and the drum.

8. In a wire-drawing machine, a wire-drawing drum, a reducing-die, a second drum, a second die between the first said drum and the second drum, and a positively-driven wire-forwarding seat on said second drum mounted for a limited yielding or cushioning movement.

9. In a wire-drawing machine, a series of drums and dies adapted to impart successive reductions to the wire, said drums having yielding positively-driven wire-seats.

10. In a wire-drawing machine, a drum having a wire-seat composed of a lubricating material capable of coating by attrition wire having substantially the hardness of steel.

11. A wire-seat for wire-drawing drums composed of a metallic alloy similar to that used in coating the wire.

12. A wire-seat for wire-drawing drums composed of a material softer than the wire.

In testimony whereof I have affixed my signature in presence of two witnesses.

JAMES A. HORTON.

Witnesses:
W. W. GIBBS,
CHAS. F. BROWN.